9814X
J. Taylor,
Bit Stock,
Patented June 30, 1836.
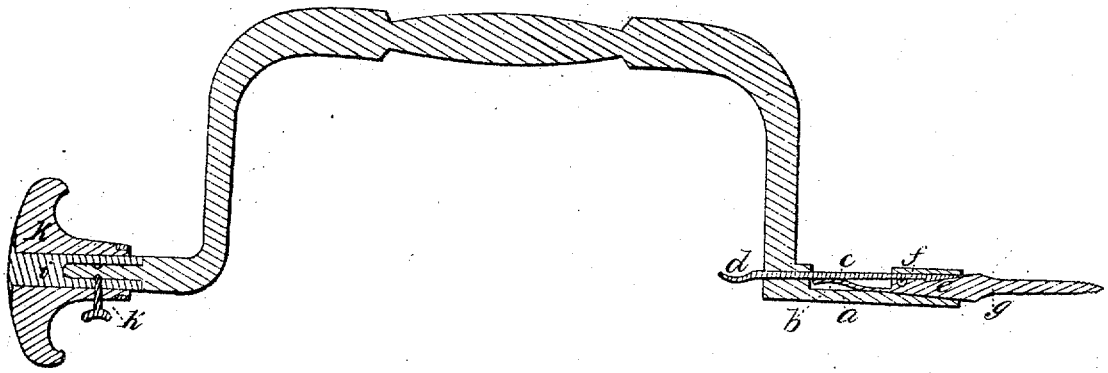

9814X June 30, 1836 5.

Jeremy Taylor of Hebron, State of Connecticut.

Letters Patent.

The schedule referred to in these Letters Patent and making part of the same
containing a description in the words of the said Jeremy Taylor, himself of
his improvement in the turned iron or steel Bitstock.

To all to whom these presents shall come.
Be it known that I Jeremy Taylor of the town of Hebron in the County
of Tolland and State of Connecticut, have invented a new and useful im-
provement in the turned iron or steel Bitstock, and that the following is a full
& exact description of the said improvement as made by me,
In this improved bitstock, the bit-end has a steel spring which is laid
in at an opening on the outside of the stock about three inches long & over the
spring is a lever having a thumb piece on one end & a catch on the inside
at the other end to hold the bit, and moving on a pin or fulcrum which
passes through the stock between the spring and the catch about an inch
from the catch, The head of the Bitstock has an iron or steel stem,
about three inches long, on one end of which the head is firmly rivetted;
the other end has a socket drilled in it about two inches deep, so as to receive
the upper end of the main shaft of the stock, which is fitted with a shoulder
& ball end, so as to turn on the socket; in which it is kept by a screw or pin
passing through the stem, & entering a channel or groove near the part turning
within. In other respects the construction of this bitstock resembles those
in common use, The advantages of this improved bitstock con-
sists in its allowing of a much stiffer spring than those heretofore used, by
which the bit is better kept in its place, In consequence of its being worked
with a lever, and in its turning in iron instead of brass or other softer
materials, & in being so made that the parts may be separated at plea-
sure. What I claim as new and my own invention in the above
improvement & for the use of which I ask an exclusive privilege, is the
manner in which the spring by force of which the bit is kept in, is in-
-serted 9814X June 30, 1836 so as to be operated upon by a lever placed over the same, together with the manner in which the lever is made a part of the stock, and the principle of the lever applied, for the purpose of giving greater effect to the spring and of working the same with more ease. I also claim as new & my own invention the manner in which the head is fastened to the stem or socket & the manner in which the main part of the stock is retained in the socket by means of a pin or screw, & channel or [illegible]

In testimony whereof I have hereunto set my hand this 23 day of June A.D. 1836.

Jeremy Taylor

[illegible] Witnesses

[illegible] Jos W. White.

Horace Foster.

608 [illegible]

Patented 30th June 1836

Drawing